United States Patent [19]
Wang

[11] Patent Number: 5,611,634
[45] Date of Patent: Mar. 18, 1997

[54] PIVOTAL DEVICE FOR A PLAYPEN

[76] Inventor: Kun Wang, No. 51, Lane 31, Sec. 2, Changping Rd., Taichung, Taiwan

[21] Appl. No.: 584,078

[22] Filed: Jan. 11, 1996

[51] Int. Cl.$^6$ ........................................................ A47D 7/00
[52] U.S. Cl. ............................ 403/102; 403/315; 5/99.1; 5/98.1
[58] Field of Search ...................................... 403/102, 106, 403/84, 329, 315; 5/99.1, 98.1, 98.3

[56] References Cited

U.S. PATENT DOCUMENTS

| | | | |
|---|---|---|---|
| 3,162,865 | 12/1964 | Tigrett | 5/99.1 X |
| 5,483,710 | 1/1996 | Chan | 403/102 X |
| 5,485,655 | 1/1996 | Wang | 5/99.1 X |
| 5,497,517 | 3/1996 | Wang | 403/102 X |
| 5,530,977 | 7/1996 | Wang | 5/99.1 |

*Primary Examiner*—Anthony Knight
*Attorney, Agent, or Firm*—Ralph F. Crandell

[57] ABSTRACT

A pivotal device for a playpen which has at least two siderails pivotally connected to the pivotal device comprising a connector with two open ends for the corresponding siderail to be pivotally engaged therein by a first pin extending therethrough, a resilient element received in each of the siderails and having a first protrusion extending through a fifth hole defined in the siderail, the connector having a first elongated slot, a second hole below the first elongated slot and two third holes respectively defined therein, a locking member slidably mounted to a top of the connector and having a sixth hole and a second elongated slot defined therein, a second pin extending through the first elongated slot and the sixth hole, a third pin extending through the second hole and the second elongated slot, when folding the playpen, the first protrusions are pushed inwardly by being pressed, each of the siderails can be rotated about the corresponding first pin and the second pin is moved downwardly by the siderail when rotating so as to pull the locking member downwardly but when extending the playpen, the second pin is remained and the oval hole is therefore in misalignment with the third hole.

4 Claims, 6 Drawing Sheets 5,611,634

PIVOTAL DEVICE FOR A PLAYPEN

BACKGROUND OF THE INVENTION

1. Field of the Invention

The present invention relates to a pivotal device and more particularly, to a pivotal device for a playpen.

2. Brief Description of the Prior Art

Generally, a conventional playpen is designed for children to play therein, the playpen usually has a pivotal device disposed thereto such that the pivotal device pivotally connects two siderails and the playpen therefore is able to be folded so as to occupy less space. Although the pivotal devices of some of conventional playpens have a common feature of being easily operated to fold or to extend the playpens, they lack a locking feature such that the pivotal device could be unintentionally activated by children and the playpen could fold suddenly and the children in the playpen could be hurt.

The present invention intends to provide a pivotal device which has a locking feature to prevent the pivotal device from unintentionally being actuated by the children in the playpen, therefore can mitigate and/or obviate the above-mentioned problems.

SUMMARY OF THE INVENTION

The present invention provides a pivotal device for a playpen which has at least two siderails pivotally connected to the pivotal device and the pivotal device comprises a connector with two open ends for the corresponding siderail to be pivotally engaged therein by a first pin extending therethrough. A resilient element is received in each of the siderails and has a first protrusion extending through a fifth hole defined in the siderail.

The connector has a first elongated slot, a second hole below the first elongated slot and two third holes respectively defined therein. A locking member is slidably mounted to a top of the connector and has a sixth hole and a second elongated slot defined therein, a second pin extending through the first elongated slot and the sixth hole, a third pin extending through the second hole and the second elongated slot.

When folding the playpen, the first protrusions are pushed inwardly by being pressed, each of the siderails can be rotated about the corresponding first pin and the second pin is moved downwardly by the siderail when rotating so as to pull the locking member downwardly but when extending the playpen, the second pin is remained and the oval hole is therefore in misalignment with the third hole such that the first protrusions are prevented from being pressed.

It is an object of the present invention to provide a pivotal device for a playpen and which has a feature of preventing unintentional actuation when the playpen is extended.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
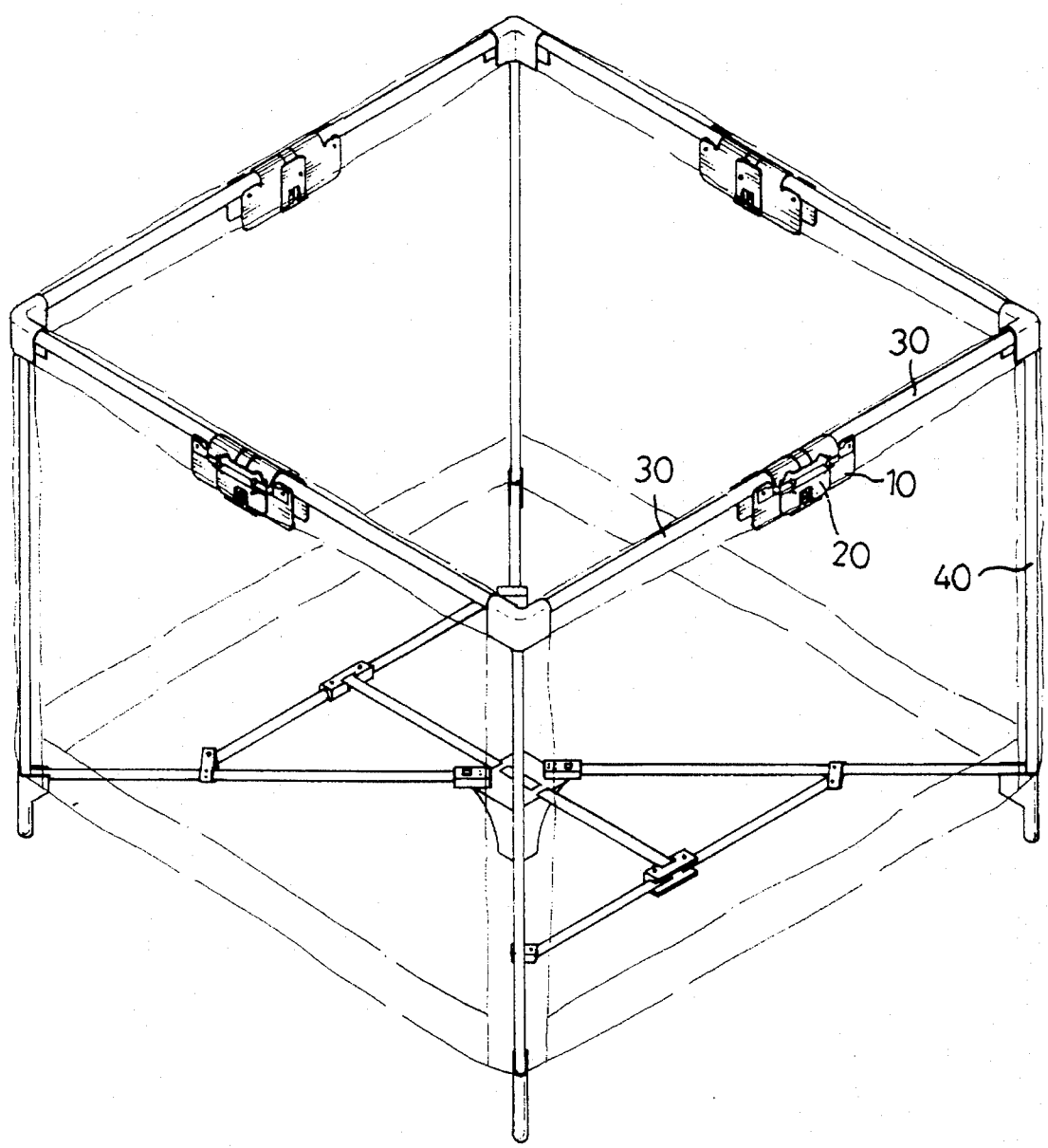
FIG. 1 is a perspective view of a playpen equipped with a pivotal device in accordance with the present invention.
Figure 2:
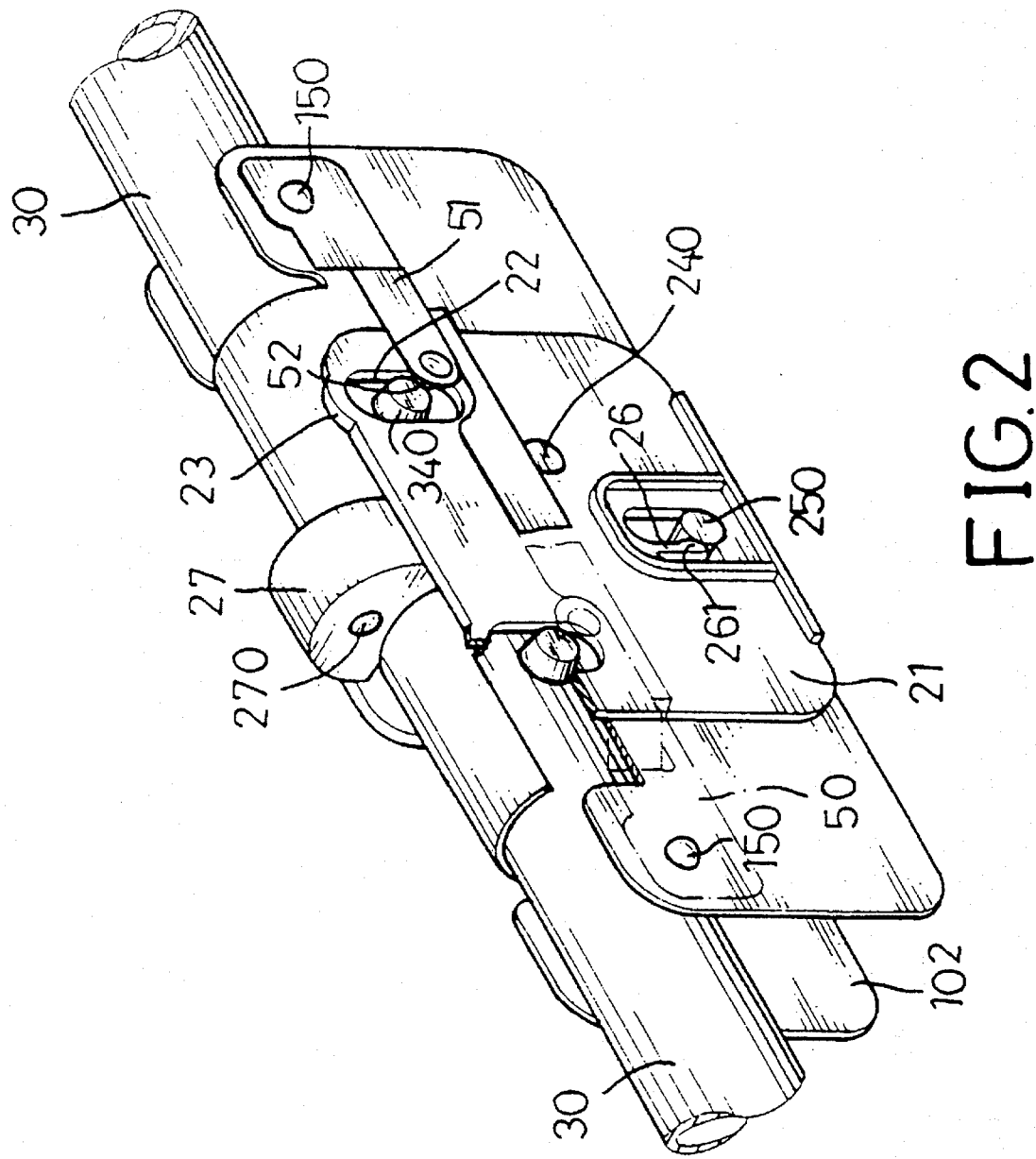
FIG. 2 is a perspective view of the pivotal device in accordance with the present invention.
Figure 3:
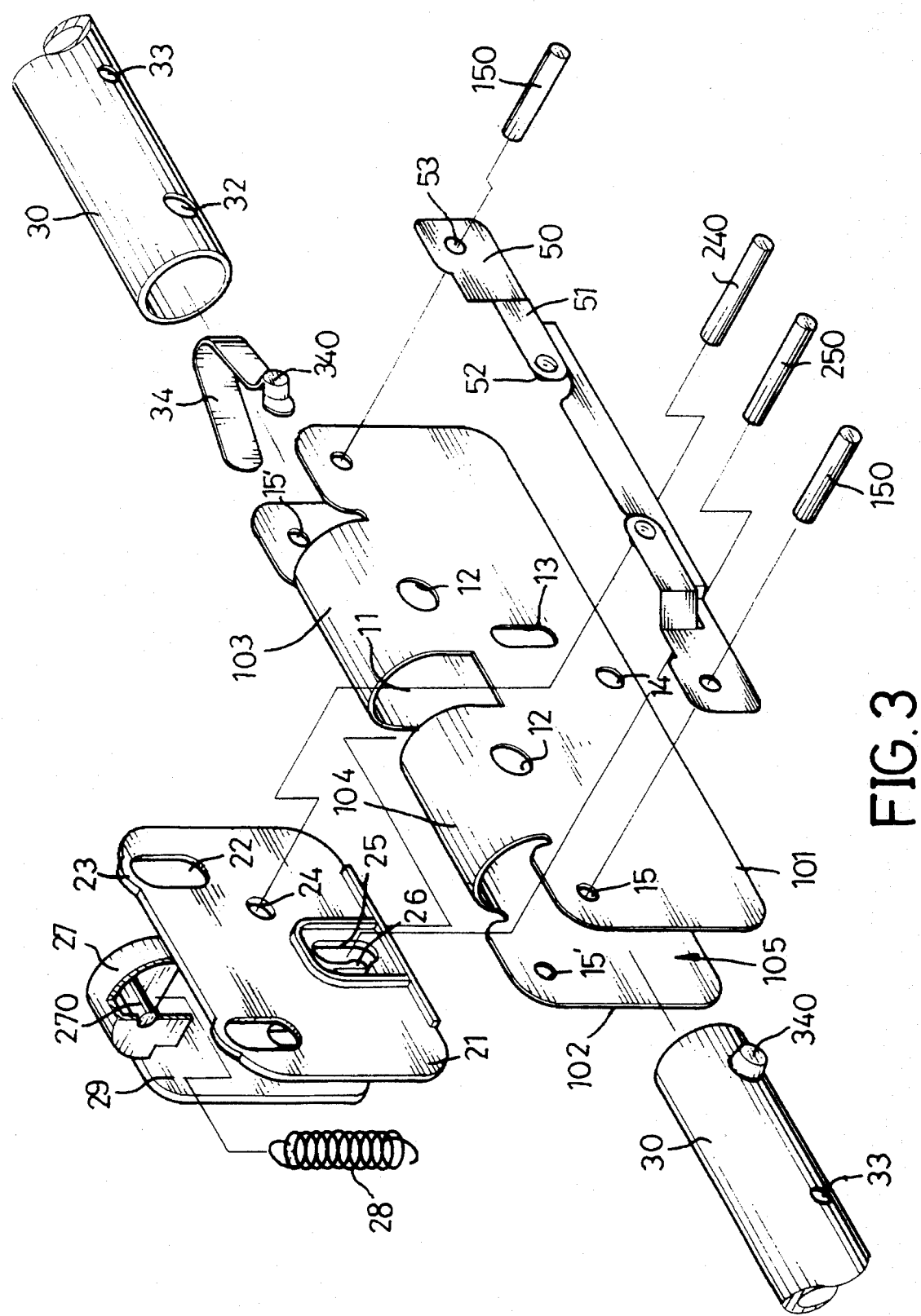
FIG. 3 is an exploded view of the pivotal device in accordance with the present invention.

Referring to the drawings and initially to FIGS. 1 through 3, a playpen comprises four pairs of siderails 30 to form a rectangular playpen, each pair of siderails 30 pivotally connected by a pivotal device, each of the siderails 30 having a first end connecting to a column 40 of the playpen and a second end pivotally connected to the pivotal device. The pivotal device in accordance with the present invention generally includes a connector 10 composed of a first plate 101 and a second plate 102, an upper edge of each one of the first and the second plates 101, 102 being connected by a first bridging element 103 and a second bridging element 104 connected therebetween so as to define a passage 105 between the first and the second plates 101, 102 beneath the first and the second bridging elements 103, 104, and a cutaway 11 (FIG. 3) defined between the first and the second bridging elements 103, 104. Each of the first plate 101 and the second plate 102 has a pair of first holes 15, 15' defined in each one of two ends thereof, a first elongated slot 13 and a second hole 14 defined in each of the first and the second plates 101, 102 between the two first holes 15, 15' wherein the second hole 14 is located below the first elongated slot 13. A third hole 12 is defined in each of the first and the second bridging elements 103, 104 and is located on a side corresponding to the first plate 101.

The second end of each of the siderails 30 has two fourth holes 33 defined diametrically therein and a fifth hole 32 defined in the siderail 30 near the second end of the siderail 30. A resilient element 34 is received in each of the siderails 30 and has a first protrusion 340 extending through the fifth hole 32.

A locking member 20 can be slidably mounted to the first and the second bridging elements 103, 104 and has a front plate 21 and a rear plate 29 between which a cap element 27 connectedly extends. The front plate 21 has two oval holes 22 and a sixth hole 24 respectively defined therein, the two oval holes 22 located corresponding to the third holes 12 of the connector 10 and the sixth hole 24 located corresponding to the first elongated slots 13. A lug portion 23 extends from an upper edge of the locking member 20 and is located above each of the oval holes 22 of the locking member 20. A second elongated slot 25 is defined in the front plate 21 wherein a tongue 26 extends from an inner periphery defining the second elongated slot 25 and the tongue has an enlarged portion 261 formed to a distal end thereof wherein the second elongated hole 25 is located corresponding to the second holes 14. A rod 270 is disposed to the cap element 27.

An outer plate 50 has a first and a second end each of which has a seventh hole 53 defined therein, each of the seventh holes 53 being located in alignment with the first holes 15, 15' corresponding thereto such that the outer plate 50 is engaged to the connector 10 by a first pin 150 extending therethrough. The outer plate 50 has a clearance defined between the outer plate 50 and the first plate 101 of the connector 10 for the front plate 21 of the locking member 20 being slidably inserted therethrough. The outer plate 50 has two flexible members 51 extending therefrom, each of the flexible members 51 having a second protrusion 52 extending from a distal end thereof and the second protrusion 52 extending toward the third hole 12 corresponding thereto.

Figure 4:
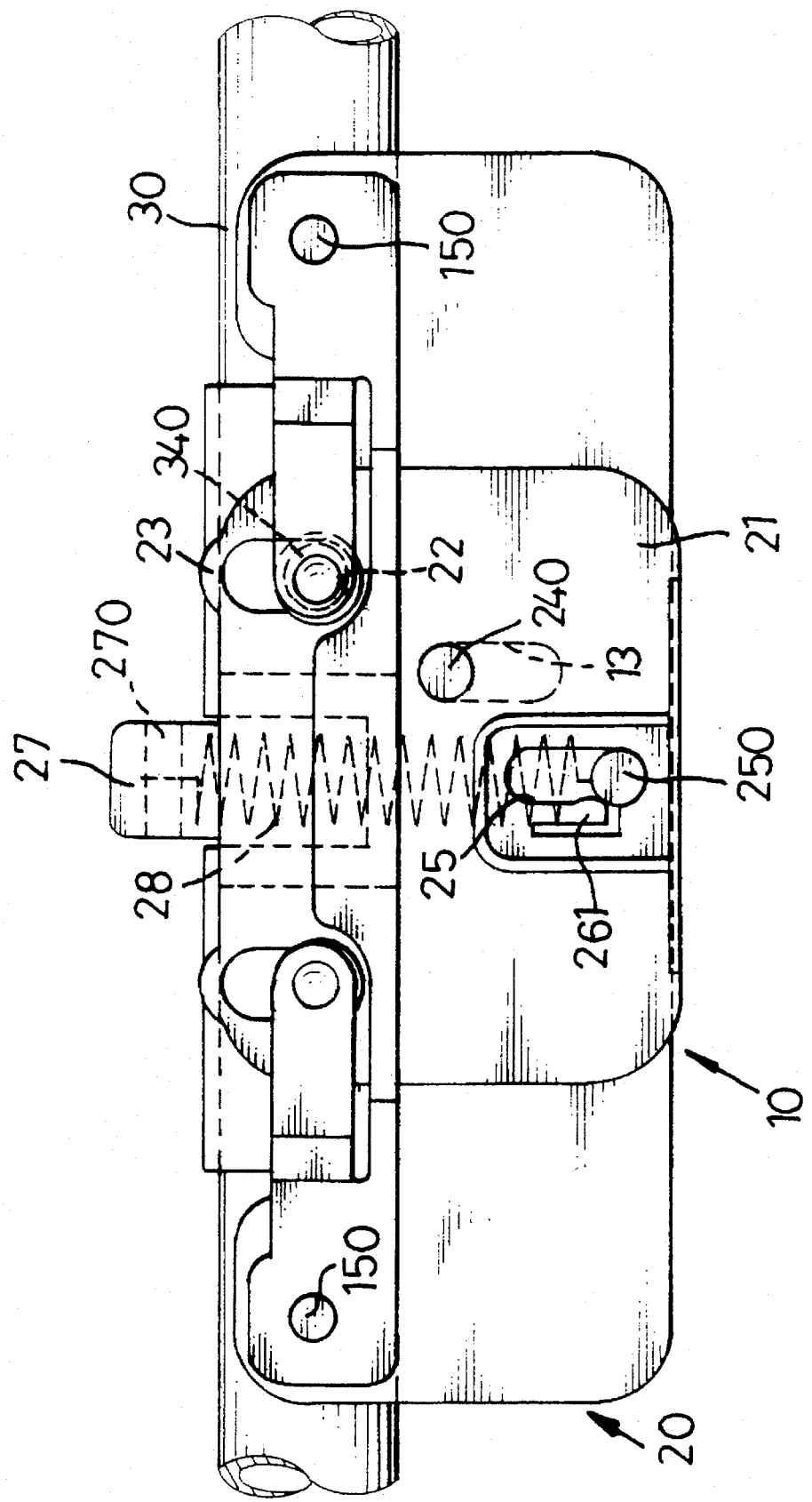
FIG. 4 is a side elevational view, partly in section, of the pivotal device when siderails are extended and a locking member is in an upper position.
Figure 5:
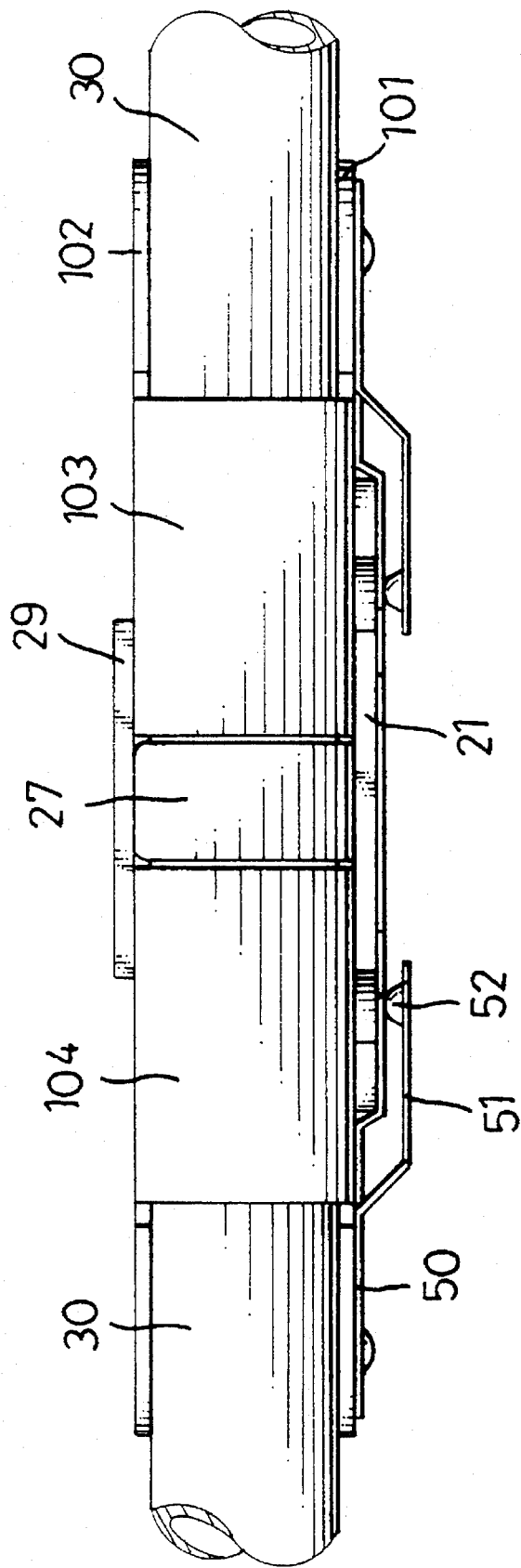
FIG. 5 is a top plan view of the pivotal device and the siderails.

Referring to FIGS. 4 and 5, the second end of each of the siderails 30 is pivotally received in one of two ends of the connector 10 by securely extending the first pin 150 through the seventh hole 53 of the outer plate 50, the first hole 15 of the first plate 101, the fourth holes 33 of the siderail 30 and the first hole 15' of the second plate 102. The first protrusion 340 extends through the corresponding fifth hole, the third hole 12 and the oval hole 22. A second pin 240 securely extends through the sixth hole 24 of the front plate 21 and the two first elongated slots 13 of the connector 10, and a third pin 250 securely extending through the second elongated slot 25 and the two second holes 14 of the connector 10, and a spring 28 connected between the rod 270 and the third pin 250. When the siderails 30 are extended as shown in FIG. 4, the second pin 240 is received in an inner top portion defining the first elongated slot 13 and the rod 270 is received in an inner bottom portion defining the second elongated slot 25 and is securely positioned by the enlarged portion 261 of the tongue 26, the spring 28 is expanded between the rod 270 and the third pin 250 so as to position the locking member 20 in an upper position.

Figure 6:
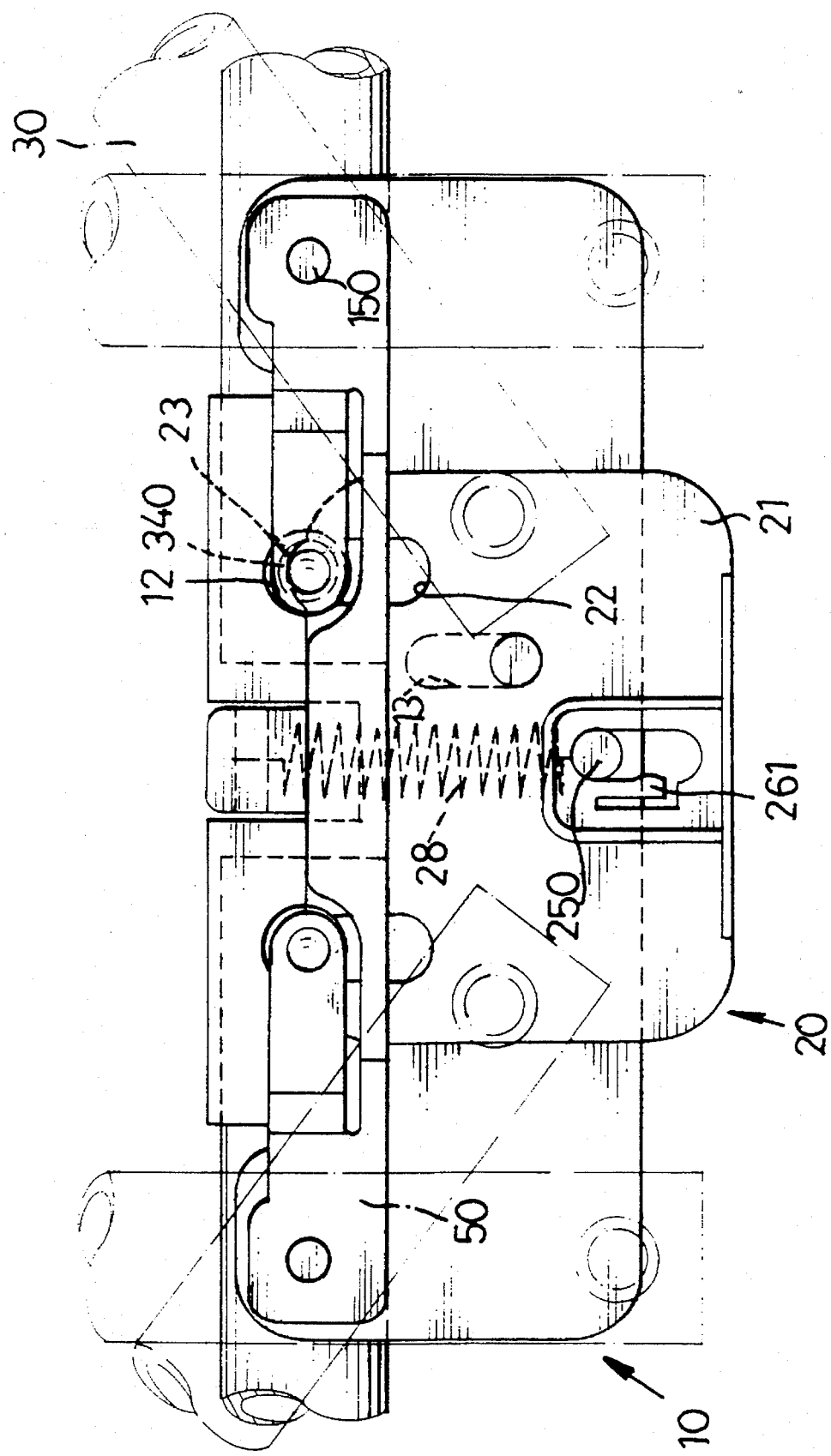
FIG. 6 is a side elevational view, partly in section, of the pivotal device when siderails are pivoted and a second pin with the locking member is pushed downwardly.

Referring to FIG. 6, when folding the playpen, a user pushes the two second protrusions 52 toward the first protrusions 340 to let the first protrusions 340 to be received in the siderails 30 via the oval holes 22 and the third holes 12, then the siderails 30 are able to be rotated about the corresponding first pin 150 to fold the playpen. A distance from the fourth hole 33 to a distal end of the second end of each of the siderails 30 is longer than a distance from the fourth hole 33 to the inner top defining the first elongated slot 13 but is shorter than a distance from the fourth hole 33 to the inner bottom defining the first elongated slot 13. Therefore, the rotating of the siderails 30 pushes the second pin 240 with the locking member 20 downwardly to a lower position by the second pin 240 moving within the first elongated slot 13, the downward movement of the locking member 20 results in the enlarged portion 261 moving away from the third pin 250 and thus the locking member 20 is biased to move downwardly by the spring 28, i.e. the oval holes 22 are not in alignment with the third holes 12. When expanding the playpen again, the siderails 30 are rotated in an inverse direction corresponding to the direction when folding and the second pin 240 located in the inner bottom of the first elongated slot 13 will not be effected by the siderails 30 such that the siderails 30 are positioned when the first protrusions 340 are received in the fifth holes 32 and the third holes 12 again. Because the locking member 20 is located in the lower position, the oval holes 22 are not in alignment with the third holes 12 which are covered by the corresponding lug portions 23 of the locking member 20, therefore the first protrusions 340 can be avoided from being pushed.

Accordingly, whenever the user extends the playpen, the locking member 20 is located in the lower position such that the user simply rotates the siderails 30 to an extended position (a horizontal position as shown in FIG. 6) then the playpen is set to be in a safe status.

Although the invention has been explained in relation to its preferred embodiment, it is to be understood that many other possible modifications and variations can be made without departing from the spirit and scope of the invention as hereinafter claimed.

What is claimed is:

1. A pivotal device for a playpen comprising at least three pairs of siderails, each pair of said siderails pivotally connected by said pivotal device, each of said siderails having a first end connecting to a column of said playpen and a second end pivotally connected to said pivotal device which comprises:

a connector composed of a first plate and a second plate, an upper edge of each one of said first and said second plates being connected by a first bridging element and a second bridging element connected therebetween so as to define a passage between said first and said second plates beneath said first and said second bridging elements, a cutaway defined between said first and said second bridging elements, each of said first plate and said second plate having a first hole defined in each one of two ends thereof, a first elongated slot and a second hole defined in each of said first and said second plates between said two first holes wherein said second hole is located below said first elongated slot, a third hole defined in each of said first and said second bridging elements and located on a side corresponding to said first plate;

said second end of each of said siderails having two fourth holes defined diametrically opposite therein and a fifth hole defined in the siderail, a resilient element received in each of said siderails and having a first protrusion extending through said fifth hole;

a locking member mounted to said connector and having a front plate and a rear plate between which a cap element connects, said front plate having two oval holes and a sixth hole respectively defined therein, a second elongated slot defined in said front plate wherein a tongue extends from an inner periphery defining said second elongated slot and said tongue having an enlarged portion formed at a distal end thereof, a rod disposed to said cap element; and said second end of each of said siderails is pivotally received in one of two ends of said connector by securely extending a first pin through said first hole of said first plate, said fourth holes of said siderail and said first hole of said second plate, said first protrusion extending through said corresponding fifth hole of said siderail, said third hole of said connector and said oval hole of said locking member, a second pin securely extending through said sixth hole of said front plate and said two first elongated slots of said connector, a third pin securely extending through said second elongated slot of said locking member and said two second holes of said connector wherein a spring is connected between said rod and said third pin.

2. The pivotal device as claimed in claim 1 wherein a distance from said fourth hole to a distal end of said second end of each of said siderails is larger than a distance from said fourth hole to an inner top defining said first elongated slot but is shorter than a distance from said fourth hole to an inner bottom defining said first elongated slot.

3. The pivotal device as claimed in claim 1 wherein an outer plate is fixedly engaged to said first plate and has a first and a second end each of which has a seventh hole defined therein, each of said seventh holes being located in alignment with said first holes corresponding thereto such that said outer plate is engaged to said connector by said first pin extending through said seventh holes of said outer plate and said first holes of said connector, said outer plate having two flexible members extending therefrom, each of said flexible members having a second protrusion extending from a distal end thereof and said second protrusion extending corresponding to said third holes of said connector.

4. The pivotal device as claimed in claim 1 wherein said outer plate has a clearance defined between said outer plate and said first plate of said connector for said front plate of said locking member being slidably inserted therethrough.

* * * * *